H. A. WILLIAMS.
Assignor to the H. A. WILLIAMS MANUFACTURING COMPANY.
MACHINE FOR REDUCING METAL RODS.
No. 10,932. Reissued May 15, 1888.
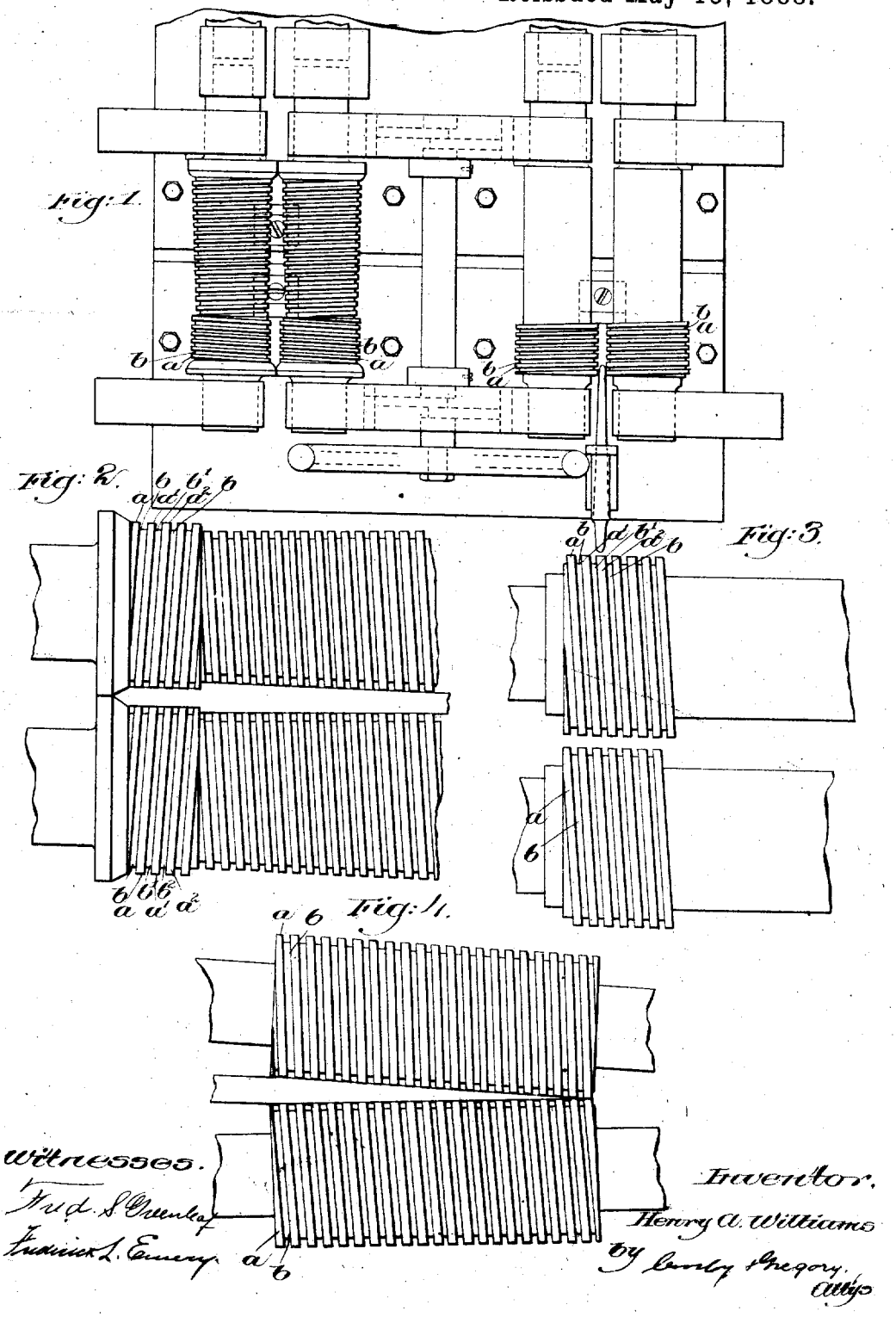

UNITED STATES PATENT OFFICE.

HENRY ALEXIS WILLIAMS, OF TAUNTON, MASSACHUSETTS, ASSIGNOR TO THE H. A. WILLIAMS MANUFACTURING COMPANY, OF SAME PLACE.

MACHINE FOR REDUCING METAL RODS.

SPECIFICATION forming part of Reissued Letters Patent No. 10,932, dated May 15, 1888.

Original No. 367,879, dated August 9, 1887. Application for reissue filed April 17, 1888. Serial No. 271,340.

*To all whom it may concern:*

Be it known that I, HENRY ALEXIS WILLIAMS, of Taunton, in the county of Bristol and State of Massachusetts, have invented a new and useful Improvement in Machines for Reducing Metal Rods, of which the following is a specification, reference being had to the accompanying drawings.

Figure 1 is a plan of part of a machine provided with reducing and finishing rolls embodying my invention. Fig. 2 shows a portion of a pair of finishing-rolls embodying my invention, with part of a spindle between them. Fig. 3 shows a portion of a pair of reducing-rolls embodying my invention; and Fig. 4 shows a pair of rolls of uniform diameter embodying my invention, with a portion of a spindle between them.

Machines for reducing metal rods by pressure between a pair of rolls, with the axis of the rod substantially parallel with the axis of the rolls, have long been known; and my invention is an improvement applicable to machines of this class, including machines in which the working-surfaces are on plates instead of rolls, for, as will be clear, the working-surface may be either the periphery of a roll or the face of a metal plate. Inasmuch as I esteem that form of machine in which rolls are used as preferable, I have shown my invention as applied to that form; but, as will be clear, it is applicable to either form.

In reducing-machines I have found that the amount of surface-contact between the surfaces of the reducing rolls or plates and the surface of the rod to be reduced is so great that it greatly increases the difficulty of reducing the rod to its desired shape—as, for instance, in reducing a rod of uniform diameter to a taper, (as in making spindles, hackle-pins, or the like,) or a rod of uniform diameter to varying diameters, (as in making car-coupling pins,) or in the manufacture of steel bullets from a rod of uniform diameter, I have discovered that this difficulty is obviated by cutting slanting grooves in the surfaces of the rolls, and so arranging the said grooves that the surfaces of the said rolls shall present a series of slanting grooves with strips or lands between them, the strips or lands of the rolls being opposed—that is to say, the strips or lands of one roll are diametrically opposite the strips or lands of the roll co-operating with it, the said strips or lands acting on diametrically-opposite points of the rods to be reduced. Slanting grooves thus arranged leave the working-surfaces unaltered, so far as concerns their operation in reducing the rod to its desired shape, (whether tapered, conical, spherical, or cylindrical,) but greatly affect the operation of these surfaces by causing them to act in a novel and peculiar manner, for each working-surface is practically divided into a number of narrow strips or lands, each doing its part of the work. Moreover, the slanting grooves allow free space for the motion or flow of the particles of metal in the rod while being reduced.

In order to insure a smooth surface on the finished article, it is necessary that the width of the strips or lands shall be slightly greater than the width of the grooves, as this causes each strip or land of the working-surface to operate not only on its own portion of the rod, but also to operate at its edges on that portion of the rod operated upon by a neighboring strip or land of the working-surface. This will be clear to all skilled in the art by inspection of the drawings, which illustrate my invention as applied to the rolls of a reducing-machine which forms the subject-matter of my application for patent now pending, Serial No. 194,455, filed March 8, 1886.

In Figs. 1, 2, and 3 the rolls are designed for a spindle, and the other rolls for reducing a rod to a taper; or when a rod is inserted between them and they are brought slightly nearer together and set they simply reduce the diameter of and true the rod. These rods and the other parts shown are the same as in my pending application, (and are therefore not described here,) with the exception that the working-surfaces of the rolls are subdivided by a number of slanting grooves, $b\ b'\ b^2$, &c., to form a number of strips or lands, $a\ a'\ a^2$, &c., the strips or lands and the grooves extending entirely around the rolls. Each of these strips or lands $a\ a'\ a^2$, as will be clear, does its own work on the rod to be reduced; but the work is done far more readily and with less resistance from the metal of the rod to be reduced than if the original working-surface had not been subdivided by the grooves, because the grooves allow the metal to flow freely, which flow would be obstructed were the rolling-surfaces not subdivided by the slanting grooves.

The depth of the grooves is not material, as the purpose of the grooves is simply to reduce the amount of surface-contact between the reducing-surfaces and the rod to be reduced, in order that the metal being acted upon may have opportunity to flow, as described.

I am aware of Cook's patent, No. 162,155, dated April 20, 1875, and disclaim all that is shown in it, my rolls differing radically from his in that the grooves of my rolls extend entirely around, while in his the grooves diminish in depth and finally vanish into the surface of the roll or else end abruptly in such a manner that the roll possesses two or more surfaces unbroken by grooves.

I claim—

In a rod-reducing machine, two working-surfaces, each of which is wholly made up of a series of slanting lands, $a\ a'\ a^2$, &c., separated by grooves $b\ b'\ b^2$, &c., substantially as and for the purpose set forth.

HENRY ALEXIS WILLIAMS.

Witnesses:
ELISHA T. JACKSON,
ARCHIE T. DREW.